United States Patent [19]

Ittmann et al.

[11] Patent Number: 5,756,211
[45] Date of Patent: May 26, 1998

[54] METHOD OF MANUFACTURING HIGH FILLER CONTENT PLASTICS HAVING A GLITTER APPEARANCE

[75] Inventors: Guenther Ittmann, Gross-Umstadt; Manfred Krieg, Darmstadt, both of Germany

[73] Assignee: Roehm GmbH Chemische Fabrik, Darmstadt, Germany

[21] Appl. No.: 660,072

[22] Filed: Jun. 3, 1996

[30] Foreign Application Priority Data

Jun. 14, 1995 [DE] Germany ............ 195 21 638.5

[51] Int. Cl.$^6$ .................................................. B32B 27/00
[52] U.S. Cl. ........................... 428/409; 523/171; 523/221; 524/430; 524/437; 524/502; 524/503; 524/513; 524/523
[58] Field of Search .................. 524/432, 437, 524/513, 502, 503, 523; 523/171, 221; 428/409

[56] References Cited

FOREIGN PATENT DOCUMENTS 640651  3/1995  European Pat. Off. .

*Primary Examiner*—Ana Woodward
*Attorney, Agent, or Firm*—Oblon, Spivak, McClelland, Maier & Neustadt, P.C.

[57] ABSTRACT

The invention relates to high filler content plastic molded articles, which articles have a surface having a pronounced glitter appearance resembling that of a microcrystalline mineral material. The glitter effect is obtained by incorporating glitter-producing particles having a plastic basis and a specific gravity <2, in the composition of said articles. A method of manufacturing such molded articles is described, according to which all of the components are adjusted to corresponding densities. The products have a particularly durable simulated-rock appearance with good glitter characteristics.

20 Claims, No Drawings

METHOD OF MANUFACTURING HIGH FILLER CONTENT PLASTICS HAVING A GLITTER APPEARANCE

BACKGROUND OF THE INVENTION

1. Field of the Invention

The invention relates to high filler content plastics with a surface having a pronounced glitter appearance the same or similar to that of a microcrystalline mineral material. The invention further relates to a method of manufacturing a molded article comprised of such a material.

2. Description of the Background

High filler content plastics which resemble mineral materials in appearance have long been known (see 1992, Ullmann's Encyclopedia of Industrial Chemistry, 5th Ed., Vol. A 20, pub. VCH, pp. 494–500). They have become an important part of the market for bathroom fixtures and other home use products. Particularly important in the industry are imitation marble and imitation granite products. Manufacturing methods for such plastics are disclosed in, inter alia, Ger. OS 26 27 081, Jap. Pat. App. A 02-202,445, WO 90/01470, WO 91/11404, Eur. OS 640,651, and Ger. OS 38 21 116.

Ger. OS 26 27 081 (corresponding to U.S. Pat. No. 4,159,301) proposes the use of two types of particles in a random distribution, one of such types being colored (and/or uncolored) opaque particles, and the other being colored (and/or uncolored) translucent or transparent particles, wherein the smallest dimension of the particles of both types exceeds 200 micron.

Jap. Pat. App. A 02-202,445 (abstracted in CA 114 8000t) teaches extrusion-coating of thermoplastic plates with a coating having a content of metal powder and white pigment, to produce plates having a granite appearance. The use of granite filler particles to produce a granite appearance in kitchen sinks and bathroom articles having an acrylic resin composition has been reported (see September 1991 *Modern Plastics International* 32). Articles manufactured according to this art have a high concentration of filler in the region near the surface.

In WO 91/11404, a colored imitation granite is described which is comprised of a PMMA (polymethyl methacrylate) matrix and contains particles of aluminum oxide hydrate with diameter<100 micron;

particles of PMMA of diameter in the range 100–5000 micron, which PMMA particles contain filler materials as follows:

aluminum oxide trihydrate, in the amount of 50–70 wt. %, a colorless to white pigment, in the amount of 0–2.5 wt. % (based on the weight of said PMMA-based particles);

PMMA particles of the same (100–5000 micron) dimension, which PMMA-based particles are filled with a black pigment in the amount of 0.1–2.5 wt. % (based on the weight of said PMMA-based particles); and PMMA particles of the same (100–5000 micron) dimension, which PMMA-based particles are filled with other pigments.

The settling of the larger particles is reduced by using rheological additives.

WO 90/01470, of the same applicant, deviates from the above teaching.

Colored polyacrylate plates with a decorative stone appearance are disclosed in Ger. OS 38 21 116. The precursor stage of the matrix polymer is colored homogeneously, following which a comminuted, acrylic resin is added and distributed into said precursor stage, which added resin is also colored but is of a color different from that of the matrix polymer.

After completion of the polymerization, the molded article, wherein the original comminuted acrylic resin has settled to the bottom region of said article, is removed from the mold.

In Eur. OS 640,651, a high filler content PMMA-based plastic molded article is described which has a granite appearance. The article has incorporated in it 1–35% of platelet-shaped stratified silicate materials having metallic color(s). The glitter effect produced is limited to the bottom side of the pour-molded articles; otherwise a relatively large amount of said silicate materials must be added.

In the method according to Eur. OS 640,651, first a polymer precursor stage (PVS), is produced, comprised of:

70–95 parts by weight (pbw) methyl methacrylate,

5–30 pbw of a PMMA prepolymer (PP), and 0 to approximately 5 pbw of a silanization agent (SIM).

Particulate inorganic fillers (FS) are added to and uniformly distributed in such a polymer precursor stage (PVS), under high revolutions per minute (high-rpm) stirring. These fillers may comprise, particularly, aluminum hydroxide and aluminum oxide hydrate, in amounts of 30–80 wt. % (based on the weight of the resulting filler suspension (FSS)). The platelet-shaped stratified silicate materials are stirred into this suspension. The mixture is polymerized by radical polymerization, in a molding polymerization chamber.

Pigment manufacturers currently offer a number of products for producing plastic surfaces having a decorative glitter appearance. Invariably, these products are based on inorganic materials, e.g. metal platelets or natural mica platelets. An example is the product "Stoneware Mica", supplied by the firm Merck, of Darmstadt. Because such products are relatively dense in comparison to the polymer matrix, there is a risk of settling during hardening. The amount of the material employed is usually greater than 5 wt. %, which contributes substantially to the cost of the final product. In addition, the glitter effect tends not to be durable.

There is a current need for means of providing plastic surfaces having a decorative rock appearance with a pronounced glitter effect which is both long-lasting and attractive. The desired means should be applicable for plastic molded articles produced by a wide variety of manufacturing techniques, e.g. extrusion or injection molding of a thermoplastic polymer, or polymerization of a pour-molding mixture in a molding chamber. The effect also should not be limited to a single surface of the molded article, e.g., the bottom, as according to the state of the art wherein generally the effect is developed during hardening or polymerization. Rather, the glitter appearance should be achievable on side surfaces, even side surfaces which are surfaces of cuts, as well as on the top surface. It is further sought that the surface modification achieved according to the invention be as economical as possible. This is possible, e.g., if only a small amount of special ingredients is required.

SUMMARY OF THE INVENTION

The above-stated problem is solved according to the invention in that glitter-producing platelets (FT) in an amount of 0.1–5 wt. %, having a specific gravity <2 and diameter in the range 100–2000 microns, are incorporated into high filler content plastic molded articles, i.e., molded articles based on a polymer matrix and containing a high filler content, containing a fine particulate inorganic material (FS) in an amount of 30–80 wt. %. A surface having a rock-like appearance with pronounced glitter is produced.

DESCRIPTION OF THE PREFERRED EMBODIMENTS

The choice of the glitter-producing platelets FT is an essential feature of the invention. It was discovered that glitter-producing platelets FT having a specific gravity <2, preferably in the range 1.3–1.7, are particularly suitable. Because of the relatively low difference in density between the glitter-producing platelets FT and the surrounding polymer matrix, a quite uniform distribution of said platelets in the polymer can be achieved, and said platelets do not settle at the bottom of the molded article during hardening or polymerization. Consequently, the glitter effect is not limited to the bottom surface of the molded article but is present on the upper surface and, in particular, the side surfaces, even side surfaces which are surfaces of cuts. A particularly advantageous effect is achieved by said uniform distribution, in articles for which it is intended that a plurality of surfaces of the article will be visible, e.g. a table slab. Technical advantages are also provided by reversibility of a plate or slab, such that the top face and bottom face of the plate or slab are equally suitable for use. Low density, glitter-producing platelets FT of the type described are commercially available. As a rule, they are comprised of plastic material, e.g. polyester, which platelets may optionally be coated with coatings having a metallic gloss. A protective coating comprised of epoxy resin may also be provided. Such platelets have a specific gravity of about 1.4.

According to the invention the particle diameters of the glitter-producing platelets FT are in the range 100–2000 micron. Preferably the platelets have a mean diameter of 200–500 micron and a flat shape, with a thickness to diameter ratio of most of the platelets being in the range of 1:20 to 1:10.

A feature of the invention is that the glitter effect is obtained with a small quantity of added glitter-producing material, namely 0.1–5 wt. % (based on the weight of the final product). Generally even smaller quantities can be used. An appreciable glitter effect can be produced with <2 wt. % of glitter-producing material, or even 0.5–1 wt. %.

The glitter-producing platelets according to the invention can be incorporated in high filler content plastic molded articles produced by various methods. The platelets may be incorporated in thermoplastics by means of an extrusion or injection molding process.

The relatively high shear stresses which are generated in extrusion or injection molding machines necessitate careful choice of the processing steps. It is desirable to avoid high shear stresses in order to avoid breakage of the glitter-producing platelets. Preference is given to mild techniques. Processes involving kneading, shearing, and mixing should be avoided, to the extent possible.

In this connection, it is possible to add the glitter-producing platelets directly to high filler content granulate material which has already been prepared. Mixing is accomplished in a rotary drum mixer. Alternately, the glitter-producing platelets may be incorporated along with the filler materials, in the process of forming the granulate. When an extrusion method is used, if possible the glitter-producing platelets are incorporated in a master batch. When a pour-molding method or the like is used, special techniques are needed to incorporate the glitter-producing platelets into the high filler content molding-resin, described below. However, the result is a glitter effect of particularly high quality. The means by which glitter-producing platelets are incorporated in a molding-resin comprise an important embodiment of the invention.

The materials used for the polymer matrix of the high filler content plastics are generally those of the state of the art, in particular any of the materials employed in injection molding, extrusion, or pour-molding or the like. Suitable materials include PVC, polyethylene, polycarbonate, polystyrene, polyester, and, preferably, polymethyl methacrylate (PMMA). A PMMA polymer matrix gives rise to a particularly good glitter effect. Such a matrix should be comprised of PMMA in an amount of at least 60 wt. %, preferably at least 80 wt. %.

A wide range of possibilities is afforded for the appearance of the decorative imitation stone material. The colors and sizes of the filler materials may be selected and combined as desired. Rock-like structures not known in nature may be devised; in most cases, however, the objective will be to simulate natural rock surfaces. Marble and granite are particularly in demand.

The general method used for the preferred embodiment, namely incorporation of the described glitter-producing platelets into a pour-molding resin or the like based on PMMA, may be according to the state of the art. A preferred embodiment is described hereinbelow.

A preferred embodiment of the invention, providing a particularly impressive and natural-looking imitation granite surface, is as follows: The glitter-producing platelets FT and ground particulate material(s) GP of different color(s), the latter having particle sizes up to about 5 mm, are stirred into a filler suspension FSS of high filler content, following which the polymerization is carried out. Possible ground particulate materials of various colors (GP) which may be used include, advantageously, such material comprised of the hardened, filled polymer material itself, e.g. comminuted recycled material. However, experience has shown that at least two problems occur in connection with incorporation of comminuted filled PMMA polymer material:

The GP particles tend to settle, at sharply differing sedimentation rates depending on the particle size and the time before gelling of the polymerization mixture, thereby making it difficult or impossible to achieve a reproducible structure;

GP particles comprised of recycled material swell rapidly in the filler suspension (FSS), with a resulting increase in viscosity, such that it is virtually impossible to carry out the mixing in the polymerization chamber, and at best the resulting structure is mediocre and undeveloped.

Thus the problem was presented of devising a method which enables incorporation of comminuted filled polymer materials without the above-recited problems and the deleterious consequences of same on the polymer material produced. This problem is solved in the context of the present invention on the basis of a combination of advantageous means:

1. The density of the ground particulate material (GP) is adjusted to match that of the filler suspension (FSS). This prevents settlement even over a relatively long time, and avoids the problem of differences in sedimentation of particles of different sizes (so-called "classification"). Advantageously the said adjustment of density is accomplished by varying the filler concentration in said ground particulate material (GP).

2. To prevent an excessive increase in the viscosity during the processing period, the polymer of the ground particulate material (GP) is crosslinked with a crosslinking monomer, in the amount of about 10 wt. % crosslinking monomer.

Thus, the invention relates to a method of manufacturing high filler content plastics based on PMMA, employing a pour-molding process or the like, starting with a polymer precursor stage (PVS) which is comprised of methyl methacrylate and a PMMA prepolymer (PP), which precursor stage is converted to a filler suspension (FSS) by adding at least one particulate inorganic filler (FS) in the amount of 30–80 wt. % (based on the weight of the FSS), under high-rpm stirring, followed by polymerization in a suitable mold, with the addition of at least one radical initiator; characterized in that the glitter-producing material (FT) as well as one or more filled ground particulate materials (GP) of a different color or colors are added to the filler suspension FSS, under stirring, in an amount of 1–20 pbw (based on the weight of the filler suspension FSS), with the provision that the density of the ground particulate material (GP) is adjusted to match the density of the filler suspension; and in that the polymer component of the ground particulate material GP is crosslinked.

The ground particulate material (GP)

The ground particulate material GP as a rule has particle diameters in the range 0.02 to approximately 5 mm. In general the type of polymerized material in the GP is the same as that of which the filler suspension (FSS) is comprised, except that the claimed features of adjusting the density and providing crosslinking are implemented. The density adjustment is accomplished by varying the filler concentration in said ground particulate material GP. An exemplary embodiment is aluminum hydroxide at a concentration of 66 wt. %, as the particulate inorganic filler FS in the filler suspension FSS, and at a concentration of about 44–55 wt. % in the ground particulate material GP. The specific gravity of the filler suspension FSS in this exemplary embodiment is adjusted to about 1.6. The glitter-producing platelets FT which are incorporated into the ground particulate material GP have a specific gravity which is comparable to this. E.g., polyester glitter-producing platelets FT have a specific gravity of 1.4. Thus, advantageously the specific gravities of the filler suspensions FSS, ground particulate material GP, and glitter-producing platelets FT are in the range 1.3–1.7.

The method of manufacturing the polymeric ground particulate material GP is essentially the same as that used for the PMMA-based main material. A filler is stirred into a polymer precursor stage comprised of a prepolymer and monomer(s), and generally the same monomers are used; provided, that the ground particulate material GP is always crosslinked, via the addition of one or more crosslinking monomers. Customary crosslinking agents may be used, comprising monomers having a plurality of polymerizable groups in the monomer molecule. Examples are:

(meth)acrylic acid esters of polyhydric alcohols;

allyl esters.

(See Rauch-Puntigam, H. and Voolker, Th., 1986, "Acryl- und Methacrylverbindungen", pub. Springer-Verlag.) Specific examples are: ethylene glycol di(meth)acrylate, 1,4-butanediol di(meth)acrylate, triethylene glycol di(meth) acrylate, and 2ethyl-2-hydroxymethyl-1,3-propanediol tri (meth)acrylate. The amount of crosslinking monomer used is relatively high, being generally at least 1 wt. % and as high as 20 wt. % (based on the total weight of the monomers). A typical value is 15 wt. %. In the un-crosslinked state, the molecular weight is in the range 200,000–5,000,000 Dalton.

Suitable fine particulate inorganic materials for use as the filler FS are any of the usual materials used for pour-molded resins. The content of filler FS is adjusted such that the ground particulate material GP has the same density as the filler suspension FSS. Advantageously, the polymeric ground particulate material GP is prepared from suitably colored polymer. Colorants FM used may be pigments or dyestuffs customarily used for the purpose.

Examples are iron oxide, titanium dioxide, zinc white, ultramarine blue, copper-phthalocyanine, and carbon black. Pigments may also be used in the form of dispersions prepared with the aid of suitable dispersants. These dispersions are introduced into the prepolymer phase, in preparing the ground particulate material GP. In general, the content of colorants FM in the polymer which is the basis of the ground particulate material GP is in the range 0.2–5 wt. % (based on the weight of said polymer).

The filler suspension FFS

The filler suspension FSS is comprised of a polymer precursor stage PVS, which is comprised of the monomers, the prepolymer PP, and the fillers FS. The filler suspension FSS is prepared advantageously by methods which are per se known (see Eur. Pat. 218,866 and Ger. OS 42 25 309). Materials for use as the prepolymer PP include, e.g., PMMA polymers customarily used, which may contain lesser amounts of suitable comonomers, e.g. other acrylic- and/or methacrylic acid esters, particularly $C_1$–$C_8$-alkyl esters. The amount of prepolymer is 5–30 wt. % based on the total amount of polymerizable materials.

The filler suspension FSS may also contain crosslinking monomers which are per se known, e.g. monomers having at least two polymerizable vinyl groups in the molecule (see Rauch-Puntigam, H. and Voelker, Th., 1967, "Acryl- und Methacrylverbindungen", pub. Springer-Verlag, p. 184). Examples of such monomers with two or more polymerizable vinyl groups are ethylene glycol di(meth)acrylate, 1,4-butanediol di(meth)acrylate, triethylene glycol di(meth) acrylate, 2-ethyl-2-hydroxymethyl-1,3-propanediol tri (meth)acrylate, and allyl compounds such as allyl methacrylate and triallyl cyanurate. In general the content of crosslinking monomers in the filler suspension FSS is in the range 0.01–10 wt. %, preferably 0.1–5 wt. %, based on the total monomer content.

The content of methyl methacrylate (MMA) in the filler suspension FSS is greater than 60 wt. %, preferably 80–100 wt. % (based on the weight of the prepolymer component PP plus monomers). As disclosed, other monomers copolymerizable with MMA may be used, e.g. the abovementioned (meth)acrylic acid esters, or vinylaromatic compounds, or heterocyclic vinyl compounds, e.g. styrene, ring-substituted styrene, α-methylstyrene, vinylpyrrolidone, vinylimidazole, acrylonitrile, methacrylonitrile, and vinyl esters such as vinyl acetate or vinyl propionate. In general, the principal monomer components other than MMA are (meth)acrylic acid esters and crosslinking monomers; advantageously these along with MMA may comprise as much as 100 wt. % of the overall polymer precursor stage PVS. Particularly advantageous is a mixture comprised of monomeric methyl methacrylate and a crosslinking monomer such as, e.g., ethylene glycol dimethacrylate, with the proportions of these two components in the mixture being in the range 95:5 to 99.9:0.1 by weight. Often the polymer precursor stage PVS will contain the monomers which are components of the prepolymer PP, and in the same proportions as present in the prepolymer PP; however, they may be different. Preferably the prepolymers are dissolved in the monomers; however, they may be dispersed in the monomers. As a rule, the mean molecular weight Mw of the prepolymers is in the range 20,000 to 800,000 Dalton (as determined by gel permeation chromatography, GPC—see Mark, H. F., et al., 1987, "Encyclopedia of Polymer Science and Technology", Vol. 10, pub. J. Wiley, pp. 1–19). E.g., the prepolymer may be a copolymer of methyl methacrylate and methyl acrylate in the ratio 9:1 by weight, with mean molecular weight Mw approximately 250,000 Dalton.

The principal materials for use as particulate inorganic fillers FS are aluminum oxides, aluminum hydroxides, and aluminum oxide hydrates. Other known particulate inorganic fillers may be used, such as alkaline earth oxides, silicon dioxide, and/or titanium dioxide, in various of their modifications, clays, silicates, carbon, metals or metal alloys, metal oxides, synthetic materials such as ceramics, glass powder, porcelain, slag or finely divided silicon dioxide, quartz, kaolin, talc, mica, feldspar, apatite, barytes, gypsum, chalk, limestone, dolomite, or mixtures of any of these.

Advantageously the particles in the inorganic fillers should have a mean particle size (diameter) not greater than 100 micron, preferably not greater than 75 micron. In a particular embodiment the filler is comprised of a mixture of at least 2 components having mean average particle sizes arranged such that the ratio between the values of the mean average sizes of the large filler particles and those of the small filler particles is in the range 10:1 to 2:1, preferably in the range 6:1 to 4:1. Filler particles of size <0.1 micron should not comprise more than 10% of the volume of all filler particles. Particle sizes are determined according to customary methods, wherein the diameter is taken to be the largest dimension of the particle (see, e.g., Scarlett, B., 1965, "Filtration and separation", p. 215). The ratio of the amounts of large and small filler particles is generally in the range 4:1 to 1:4, preferably in the range 2:1 to 1:2, particularly preferably 1:1.

A preferred mixture of small filler particles and large filler particles is a mixture of Alcoa$^{(R)}$ C33 (a white hydrated alumina pigment mean particle size 45 micron) and Alcoa$^{(R)}$ C333 (a white hydrated alumina pigment with mean particle size 8 micron).

Preferably the inorganic filler is of a nature such that the hardened pour-molding resin has a shear modulus of elasticity of at least 5 GNm$^{-2}$, preferably at least 10 GNm$^{-2}$. In adjusting the parameters to achieve mechanical properties, the prospective use of the product resin is a major factor.

The proportion of filler in the pour-molding resins according to the invention is preferably at least 30 wt. %. In general, the filler content should not exceed 80 wt. %. As a general guideline, the range of filler content in the pour-molding resins is 50–80 wt. %. Known methods may be used to prepare the fillers of advantageous particle sizes, e.g. crushing and grinding.

Preparation of the pour-moulding resin suspensions

Advantageously the starting point for preparing the pour-molding resin suspensions is the liquid polymer precursor stage PVS containing the monomers and the prepolymer PP, and forming the liquid organic phase. The inorganic filler FS is introduced to the organic phase with the aid of mechanical "dissolvers". When filler fractions of different particle sizes are employed, said fractions may be added separately, with no particular order of addition of the particles of different sizes. As a rule, the process takes 10 min. The resulting filler suspension FSS is agitated for an additional 10 min using the same "dissolver" or an equivalent apparatus for accomplishing dispersion. The "dissolver" is run at a rotational speed of about 10–20 m/sec. In general, the inorganic fillers are added to the organic phase in a manner such that the viscosity does not exceed a value of about 10 Pa-sec. Advantageously the ground particulate material GP and the glitter-producing platelets FT are added at room temperature prior to addition of the initiator and a parting agent.

Then the polymerization promoting agents are added, which may be polymerization initiators (per se known) in the amount of 0.1–5 wt. % (based on the total weight of the monomers). Radical-formers are used as the polymerization initiators. These can be induced to form radicals by heat or by redox processes. Generally any initiator may be used which can provide a high input of radicals at relatively low temperatures (see Brandrup, J., and Immergut, E. H., 1989, "Polymer Handbook", 3rd Ed., pub. J. Wiley, Chap. III, pp. 1–65). Advantageously, the initiators are added shortly before the suspension comprising the pour-molding resin is added to the mold for hardening.

It may be advantageous for the pour-molding resin suspension to contain internal and/or external parting or mold release agents, to prevent adhesion of the hardened resin to the mold and to promote good surface characteristics of the molded articles comprised of said hardened resin. Examples of internal parting agents are fatty acids, alkali salts, alkaline earth salts, alkyl phosphates, and neutralized derivatives thereof. Among the suitable external mold parting agents are coatings applied to the mold, e.g. coatings comprised of polytetrafluoroethylene, polyorganosiloxanes, or polyvinyl alcohol.

Production of molded articles comprised of the pour-molding resin

The inventive suspension based on the pour-molding resin and containing the polymerization initiator can be molded with good effect by, e.g., pouring it into customary pour molds. Advantageously, the suspension is treated with vacuum prior to transferring it to the mold. Preferably the hardening is carried out via heating, e.g. at 50°–80° C. for 20–60 min, with or without pressurization.

A wide variety of molds may be used for the inventive molding-resin suspensions, with problem-free polymerization. The types of articles which can be produced include, e.g., plates, slabs, dishes, washbasins, sinks, toilets, architectural forms, and containers. Another advantageous embodiment of the invention is for continuous production of plate, on a conveyor. For this purpose, a suspension based on the pour-molding resin, to which a suitable initiator has been added, is applied to a moving metal conveyor belt having lateral boundary means. The suspension, having low viscosity and low "intrinsic viscosity", rapidly distributes and levels itself. Then, a second metal belt is applied over the surface of the suspension. The suspension can be hardened via heating of the two metal belts, or by the use of suitable redox-type initiators without external heat input.

The residual monomer content in the hardened pour-molding resin is below 1 wt. %, preferably below 0.5 wt. % (based on the total amount of monomers).

Advantageous effects of the invention

The special inventive pour-molding resin suspensions can be very successfully molded in customary pour molds. A wide variety of complex and multiple molds may be used, and the polymerization proceeds to completion without problems. Application of the described means for the molding process leads to filled polymer plates with a uniform structure on the upper and lower faces, even when the liquid phase is allowed to stand for, e.g., 2 hr. The ability to produce a plate having usable upper and lower faces is a major advantage, particularly in the case of a simulated granite plate. The surfaces of the plate have a well distributed, durable glitter appearance.

Having generally described this invention, a further understanding can be obtained by reference to certain specific examples which are provided herein for purposes of illustration only and are not intended to be limiting unless otherwise specified.

EXAMPLES

Example 1

1A) Production of white-colored ground particulate material 80 g Plexigum$^{(R)}$ M920 and 0.01 g 2,4-dimethyl-6-tertbutylphenol were dissolved in 410 g methyl methacrylate, at about 50° C., over a period of 5 hr, following which the mixture was cooled to room temperature. 5.0 g stearic acid and 50 g ethylene glycol dimethacrylate were dissolved in this MMA/PMMA syrup. Under moderate-speed stirring, 210 g Martinal$^{(R)}$ ON 310, 210 g Martinal$^{(R)}$ OS, 20 g Aerosil$^{(R)}$ 200, and 15 g Kronos $^{(R)}$ 2057 were mixed-in, in a "dissolver" apparatus. Then, operating the dissolver at about 20 m/sec, the suspension was further dispersed for about 10 min. The suspension was cooled to room temperature, and 1 g bis-(4-tert-butylcyclohexyl)peroxydicarbonate was dissolved therein. Air bubbles in the suspension were removed by brief application of a vacuum. A chamber was formed from two metal plates (thickness 4 mm) which were polished to a high gloss and chromed, and a flexible cylindrical PVC rod (diameter 6.0 mm). The suspension was poured into said chamber, and the chamber was then sealed.

The filled chamber was inserted in a water bath at 45° C. The polymerization time was 120 min. A final polymerization was then carried out in a drying cabinet for 30 min at 105° C. The chamber was then opened and the hardened molded piece was removed.

The molded piece was broken into small fragments, and these were ground in a suitable mill. The fraction 0–630 micron was removed with a sieve. The larger particles were re-milled and re-sieved.

List of products used in Example 1A

Plexigum$^{(R)}$ M920: a PMMA bead polymer having $\eta_{sp/c}$= 130–140, manufactured by Roehm GmbH.

Martinal$^{(R)}$ ON 310, OS: two different aluminum hydroxides, manufactured by Martinswerke.

Aerosil$^{(R)}$ 200: a highly dispersible amorphous silicon dioxide, manufactured by Degussa.

Kronos$^{(R)}$ 2057: a titanium dioxide, manufactured by Kronos.

1B) Production of black-colored ground particulate material

The method of Example 1A was used, except that 15 g Bayferrox$^{(R)}$ 318M was used, instead of the 15 g Kronos$^{(R)}$ 2057.

Bayferrox$^{(R)}$ 318M is an iron(III) oxide, manufactured by Bayer.

1C) Production of a high filler content plastic plate having a simulated granite appearance, with glitter effect 30 g Plexigum$^{(R)}$ M920 was dissolved in 296.99 g MMA and 0.01 g 2,4-dimethyl-6-tert-butylphenol, at about 50° C., over a period of 5 hr, following which the mixture was cooled to room temperature. 5.0 g stearic acid and 3.0 g ethylene glycol dimethacrylate were dissolved in this MMA/PMMA syrup. Under moderate-speed stirring, 332.5 g Alcoa$^{(R)}$ C33 (an aluminum hydroxide with mean particle size 45 micron) was mixed-in, in a "dissolver" apparatus, followed by 332.5 g Alcoa$^{(R)}$ C333 (an aluminum hydroxide with mean particle size 8 micron). Then, operating the dissolver at about 20 m/sec, the suspension was further dispersed for about 10 min. Using a multiple-propeller stirrer, 90.2 g white ground particulate material according to Example 1A, 19.8 g black ground particulate material according to Example 1B, and 8.3 g polyester glitter material "type 25/90 R" (obtained from the firm Dragon Werk Georg Wild GmbH, of Beyreuth) were stirred-in. The glitter material has a silver metallic gloss; its particle dimensions are 0.4×0.4×0.025 mm. Stirring time was the normal 30 min; however, substantially longer stirring times are possible. 5 g bis-(4-tert-butylcyclohexyl)-peroxydicarbonate and 1 g 2,2'-asobis (isobutyronitrile) were dissolved in the filler suspension, and air bubbles present in the suspension were removed by brief application of a vacuum.

A chamber was formed from two metal plates (thickness 4 mm) which were polished to a high gloss and chromed, and a flexible cylindrical PVC rod (diameter 4.2 mm). The suspension was poured into said chamber, and the chamber was then sealed.

The filled chamber was inserted in a water bath at 65° C. The polymerization time was 20 min. A final polymerization was then carried out in a drying cabinet for 30 min at 105° C. The chamber was then opened and the hardened molded piece was removed. The surfaces of both faces of the molded plate were glossy, exhibited no sagging, and were visually identical, having a decorative natural granite appearance with a pronounced glitter.

When the plate was subjected to matting, namely by grinding of the glossy surfaces, a pleasant-appearing matte surface was obtained which was not degraded by handling and which exhibited an enhanced glitter over that of the unground molded plate.

The disclosure of German patent application 195 21 638.5, filed Jun. 14, 1995, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A molded article having one or more surfaces having a glitter appearance the same or similar to that of a microcrystalline mineral material, said article containing 30–80 wt. % of (A) a fine particulate inorganic filler material, based on the weight of the article in (B) a polymer matrix, and 0.1–5 wt. %, based on the weight of the article, of (C) plastic-containing glitter-producing particles having a specific gravity <2 and diameter 100–2,000 microns.

2. The molded article according to claim 1, which additionally contains (D) at least one filler-containing ground particulate material having a color different from (A) which comprises (1) a polymer component which has been crosslinked by at least one crosslinking monomer, and (2) at least one inorganic filler.

3. The molded article according to claim 1, which is produced by pour-molding in a mold chamber.

4. The molded article according to claim 2, which is produced by pour-molding in a mold chamber.

5. The molded article according to claim 1, wherein the polymer matrix comprises polymethyl methacrylate in an amount of at least 60 wt. %, based on the weight of the polymer matrix.

6. The molded article according to claim 2, wherein the polymer matrix comprises polymethyl methacrylate in an amount of at least 60 wt. %, based on the weight of the polymer matrix.

7. The molded article according to claim 3, wherein the polymer matrix comprises polymethyl methacrylate in an amount of at least 60 wt. %, based on the weight of the polymer matrix.

8. The molded article according to claim 4, wherein the polymer matrix comprises polymethyl methacrylate in an amount of at least 60 wt. %, based on the weight of the polymer matrix.

9. A method of manufacturing a molded article having one or more surfaces having a glitter appearance the same or similar to that of a microcrystalline mineral material, said article containing 30–80 wt. % of (A) a fine particulate inorganic filler material, based on the weight of the article, in (B) a polymer matrix comprising polymethyl methacrylate in an amount of at least 60 wt. %, based on the weight of the polymer matrix, 0.1–5 wt. %, based on the weight of the article, of (C) plastic-containing glitter-producing particles having a specific gravity <2 and diameter 100–2,000 microns, in the composition of the articles, and (D) at least one filler-containing ground particulate material having a color different from (A) and which comprises (1) a polymer component which has been crosslinked by at least one crosslinking monomer, and (2) at least one inorganic filler, said method comprising adding the fine particulate inorganic filler material to a liquid mixture comprising polymethyl methacrylate and a monomer comprising methyl methacrylate to form a filler suspension, adding thereto the glitter-producing particles and 1–20 wt. %, based on the weight of the filler suspension, of the at least one filler-containing ground particulate material, and then polymerizing in the presence of a radical initiator in a mold, wherein the filler content in said ground particulate material is varied such that the density of said ground particulate material is adjusted to match at least approximately the density of said filler suspension.

10. The method according to claim 9, wherein the specific gravities of said filler-containing ground particulate material, said filler suspension, and said glitter-producing particles are all in the range of 1.3–1.7.

11. The method according to claim 9, wherein the amount of crosslinking monomer, based on the weight of polymer component in said filler-containing ground particulate material is about 1–20 wt. %.

12. The method according to claim 11, wherein said amount of crosslinking monomer is about 15 wt. %.

13. The method according to claim 9, wherein the particle diameters of said filler-containing ground particulate material are in the range of about 0.02 to about 5 mm.

14. The method according to claim 9, wherein said filler-containing ground particulate material comprises at least two such materials having different colors.

15. The method according to claim 9, wherein the fine particulate inorganic filler material is aluminum hydroxide.

16. The method according to claim 9, wherein highly dispersible amorphous silicon dioxide is added to the filler suspension.

17. The molded article according to claim 1, wherein the glitter-producing particles are comprised of a polyester.

18. The molded article according to claim 1, wherein the weight percent of the glitter-producing particles is less than 2 wt. %.

19. The molded article according to claim 1, wherein the weight percent of the glitter-producing particles is 0.5–1 wt %.

20. The molded article according to claim 1, wherein the polymer matrix is obtained by reacting a polymethyl methacrylate with a monomer mixture of methyl methacrylate and ethylene glycol dimethacrylate.

* * * * *